Patented Aug. 22, 1933

1,923,118

UNITED STATES PATENT OFFICE 1,923,118

MEANS FOR EFFECTING DISTRIBUTION OF FLOWING FLUIDS

Heinrich Bernhard Rüder and Willy Köpp, Frankfort-on-the-Main, Germany, assignors to International Precipitation Company, Los Angeles, Calif., a Corporation of California Application August 19, 1930, Serial No. 476,405, and in Germany September 14, 1929

2 Claims. (Cl. 137—112)

This invention relates to means for effecting uniform distribution of flowing gases or liquids upon changes in the speed or direction of flow thereof. The distributing means of the present invention has been devised particularly for use in flues or conduits through which dust-laden gas is delivered to electrical precipitation apparatus or to other gas cleaning apparatus, or for use at the point where an inlet flue or conduit enters such electrical precipitation or other gas cleaning apparatus, but it will be understood that it may be advantageously applied in any case where it is desirable to maintain uniform distribution of gas or liquid in a flowing stream, particularly under conditions where there is a tendency to the production of non-uniformity of distribution, as in case of a sudden change in cross-section or change in direction of the fluid passage.

When gases or liquids change their speed of flow, for example, upon passing from pipes or flues into wider passages such as chambers or containers for subjecting the gas to treatment of some sort, or when they change their direction of flow as for example upon lateral entrance into a chamber or container in which they are caused to flow longitudinally, it is a well known fact that eddy currents occur with resultant irregularities of distribution, and difficulty is encountered in obtaining uniform distribution of the gas or liquid over its wider area of flow or in its new direction. Attempts have been made to bring about equal distribution of the fluid under such conditions, by means of suitably disposed baffles, usually in the form of plates or strips, but such baffles in themselves create further eddy currents and increase the loss of energy or head in the fluid.

The principal object of this invention is to provide for uniform distribution of the fluid under the above conditions while causing a minimum draft loss or loss in head therein.

The above object is attained in accordance with our invention, by providing baffling means in the fluid stream defining gas passage openings therebetween whose cross-sectional shape when viewed in a direction perpendicular to the direction of gas flow resembles that of a Venturi device, such baffling means being placed adjacent the point of change in speed or direction of fluid flow. By this means an equal distribution is obtained with practically no loss in energy or head in the fluid.

The baffling means of our invention comprises, more particularly, members or bodies extending across the fluid passage and having stream line cross-sections, said bodies being so mounted and spaced as to define openings therebetween whose cross-sectional shape resembles that of a Venturi device. These baffle members consist of parallel linear members extending in one direction only across the fluid passage so as to define elongated passages therebetween, and said baffle members are adjustably mounted for movement toward or away from one another so that the width of all or any of the openings may be increased or decreased as desired.

The accompanying drawing illustrates embodiments of our invention, and referring thereto:

Figure 1:
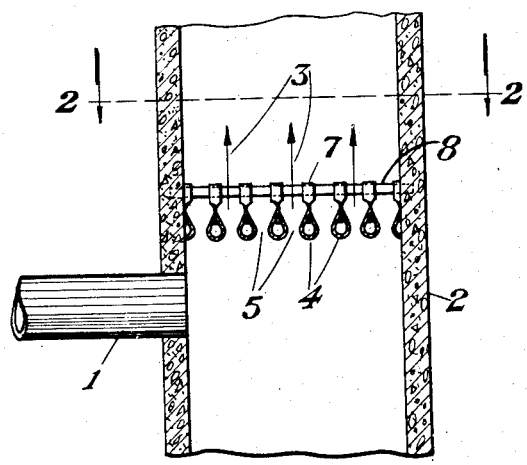
Fig. 1 is a longitudinal section of a chamber into which fluid is introduced laterally from a pipe of smaller cross-section, said chamber being provided with distributing means in accordance with our invention.
Figure 2:
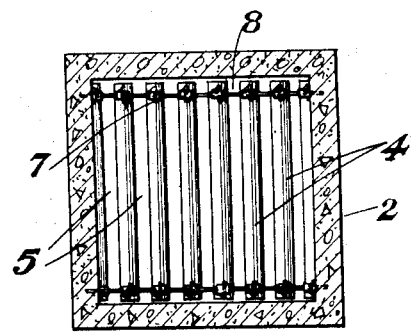
Fig. 2 is a transverse section on line 2—2 in Fig. 1.

Referring to Figs. 1 and 2, a gas or fluid is introduced through pipe or flue 1 laterally into a chamber or passage 2 of larger cross-section than flue 1, and is caused to pass longitudinally in the chamber 2, in the direction indicated by the arrows 3. Such fluid is thus caused to undergo both a decrease in speed and a change in direction. Within the chamber 2 and beyond but adjacent the opening of flue 1, are provided a plurality of parallel baffle members 4 extending across said chamber transversely to the direction of fluid flow in said chamber, said baffle members extend linearly and are shown as of hollow or tubular construction, although solid baffle members may, of course, be used if desired. Said baffle members are so spaced as to provide fluid passage openings 5 therebetween.

The baffle members 4 are of stream line cross-section with respect to the direction of fluid flow therebetween, that is to say, they are rounded at the side from which the fluid approaches and are gradually tapered substantially to a sharp edge at the side at which the fluid leaves, so that the openings 5 first converge in cross-section and then gradually diverge in the direction of fluid flow, in a manner similar to the configuration of the well known Venturi device.

Such a construction opposes sufficient resistance to fluid flow to cause equal distribution of the fluid between the respective passages 5, while substantially preventing the development of eddy currents in such fluid. The fluid is thus caused to leave the baffle members in substantially straight stream line flow, and uniformly distributed over the area of the chamber 2.

Figure 4:
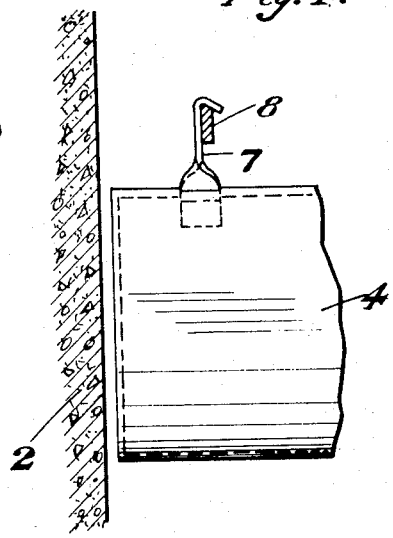
Fig. 4 is a side elevation of one of the baffle members shown in Fig. 3.

Passage 2 is shown as extending vertically, and the baffle members as extending horizontally across the passage. Said baffle members are shown as supported by means of hangers or clips 7 resting slidably upon a supporting bar 8, it being understood that one of such hangers 7 may be provided adjacent each end of each baffle member, as shown in Fig. 4, or at any other desired position along the length thereof the two supporting bars 8 on which said hangers rest, extending horizontally in the passage 2. Said hangers, with the baffle members carried thereby, may be slidably adjusted on the supporting bar 8 so as to make the fluid passage 5 of any desired width, it being understood that any desired number of these baffle members may be provided in a flue or chamber of a given width and that said baffle members may be adjusted to any desired uniform spacing or may, if desired, be adjusted to different spacings in different parts of the flue or chamber so as to counteract any tendency toward increased fluid flow at any part of the chamber and provide uniform fluid distribution throughout.

Figure 3:
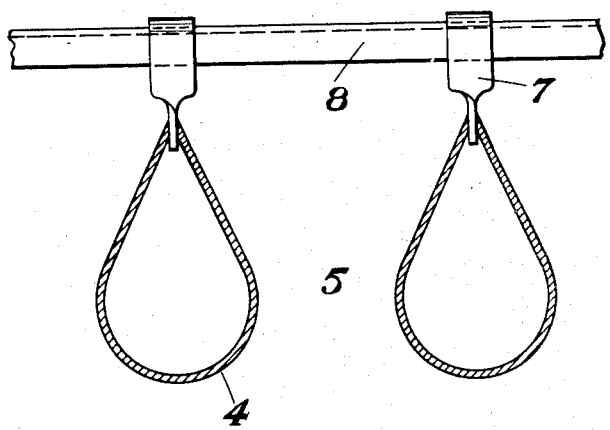
Fig. 3 is an enlarged sectional view of two adjacent baffle members adjustably mounted on supporting means.

By reason of the adjustable mounting of the baffle members on their supports, the same may be moved toward or away from one another so as to decrease or increase the width of the openings therebetween. By this means any tendency for the entering gas to become unequally distributed throughout the cross-section of the passage 2, for example by reason of the tendency of an undue proportion of the gas to pass directly upward from the intake pipe 1, may be counteracted by placing the baffle members closer together at such portion where there is a tendency to increase flow. Furthermore, by decreasing or increasing the spacing of all of the baffle members any suitable change may be made in the total resistance or baffling effect thereof, it being understood that in such an operation it will be necessary to add one or more baffle members to the series or withdraw one or more baffle members therefrom, the mounting of the baffle members on the supporting rods 8 as shown in Figs. 3 and 4 being such as to provide for removal or insertion of one or more baffle members as required.

We claim:

1. Means for effecting distribution of flowing fluids comprising, in combination with a fluid passage, a plurality of baffle members extending across said fluid passage and spaced from one another so as to define openings therebetween, said baffle members being of stream line cross-section when viewed in a direction perpendicular to the direction of fluid flow so as to cause the openings therebetween to be similar to the shape of a Venturi device, the individual baffle members being separately and adjustably mounted for independent bodily movement toward or away from one another.

2. Means defining a fluid passage and means for effecting distribution of flowing fluid therein comprising supports extending horizontally in said passage and a plurality of baffle members provided with hangers adjustably and removably supporting said baffle members on said supports.

HEINRICH BERNHARD RÜDER.
WILLY KÖPP.